C. H. OCUMPAUGH.
VOTING MACHINE.
APPLICATION FILED JAN. 23, 1903.
1,001,767.
Patented Aug. 29, 1911.
2 SHEETS—SHEET 1.
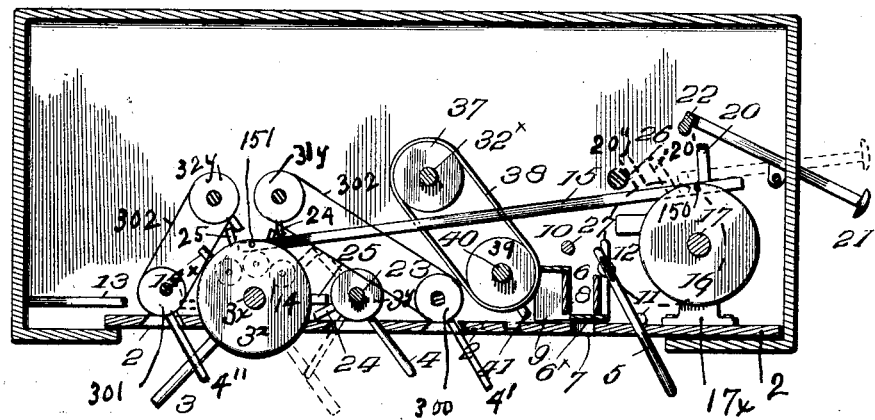
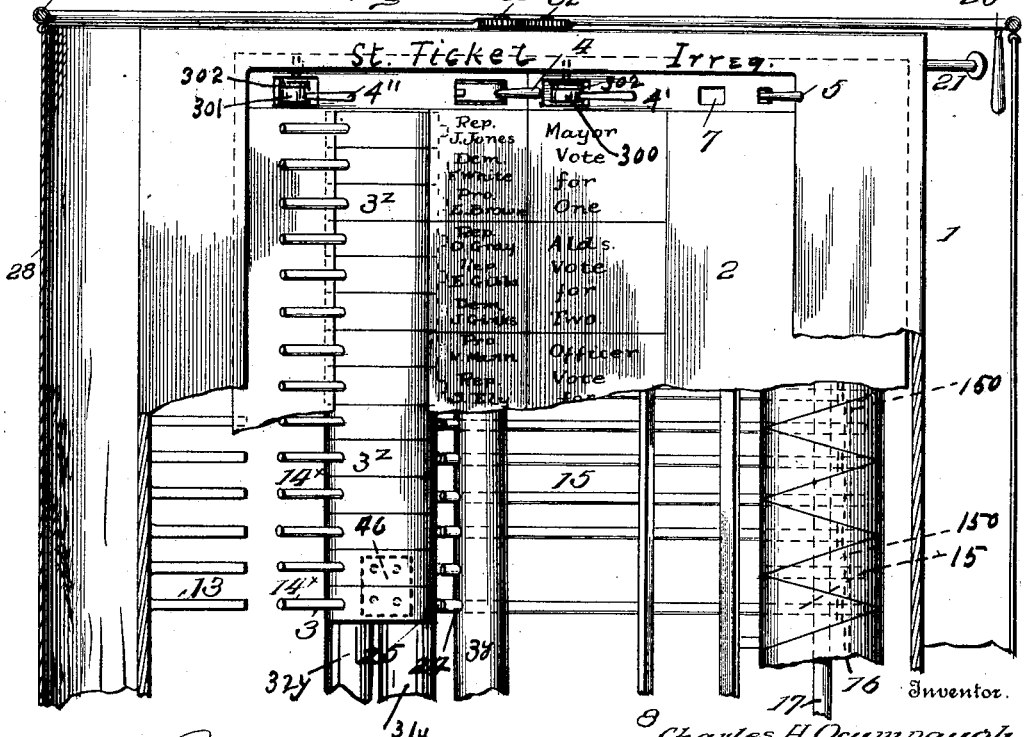

C. H. OCUMPAUGH.
VOTING MACHINE.
APPLICATION FILED JAN. 23, 1903.
1,001,767.
Patented Aug. 29, 1911.
2 SHEETS—SHEET 2.
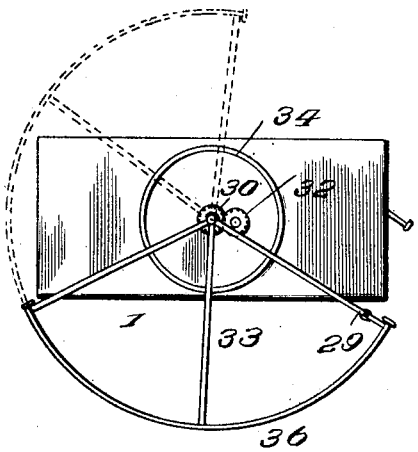
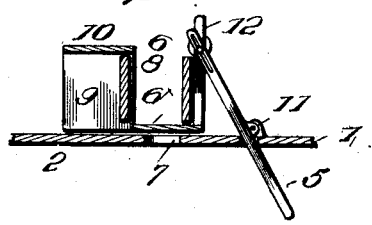
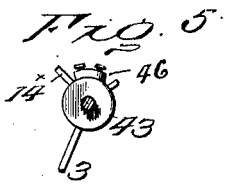
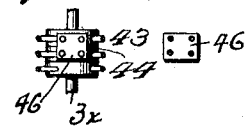
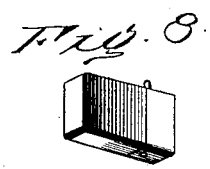
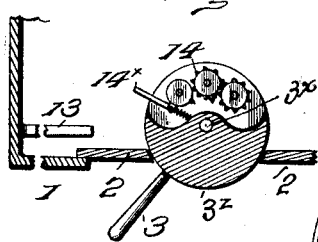
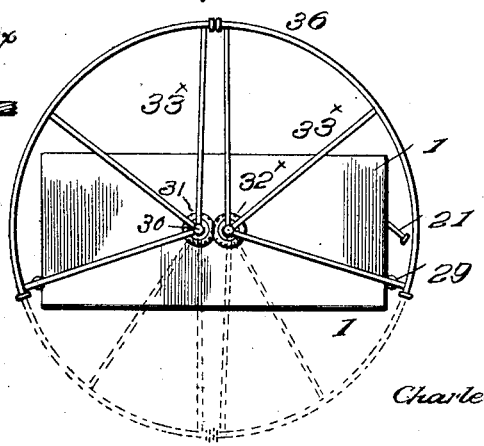
Witnesses
Inventor
Charles H. Ocumpaugh
By Benj. R. Catlin
Attorney

UNITED STATES PATENT OFFICE.

CHARLES H. OCUMPAUGH, OF ROCHESTER, NEW YORK.

VOTING-MACHINE.

1,001,767. Specification of Letters Patent. Patented Aug. 29, 1911.

Application filed January 23, 1903. Serial No. 140,304.

*To all whom it may concern:*

Be it known that I, CHARLES H. OCUMPAUGH, a resident of Rochester, in the county of Monroe and State of New York, have invented certain new and useful Improvements in Voting-Machines; and I do hereby declare the following to be a full, clear, and exact description of the invention, such as will enable others skilled in the art to which it pertains to make and use the same.

The invention relates to voting machines, and has for its object to simplify the construction and increase the efficiency of such machines.

The invention consists in the construction hereinafter pointed out.

In the accompanying drawings, Figure 1 is a broken front elevation, the curtain being withdrawn to expose the face of the improved machine; Fig. 2 is a horizontal section through the openings in the face plate for the straight ticket indicator handles; Fig. 3 is a plan; Fig. 4 is a section on a larger scale of the irregular vote receptacles shown in Fig. 2; Figs. 5 and 6 are respectively an end elevation and plan of indicators and means of connecting indicators, on a smaller scale than Figs. 1 and 2; Fig. 7 is a plan of a connecting plate; Fig. 8 is a perspective of a ballot holder; Fig. 9 is a plan of a machine casing provided with two curtain supports geared to be moved together; Fig. 10 is an enlarged section of an indicator carrying a register and shows parts co-acting with the same.

Numeral 1 denotes the machine having a movable face plate 2 which supports individual indicators that carry registers, straight ticket indicators, an irregular indicator, interlocking devices and connections between the register-carrying indicators.

3 denotes one of a series of handles of a series of individual candidate indicators $3^z$.

4 denotes one of a series of handles of straight ticket indicators $3^y$, and 4', 4'' on rotatable disks or pulleys 300 and 301, denote other straight ticket handles for different parties. Said parts 300 and 301 are operatively connected respectively, by belts 302, or by gear wheels or other suitable means, to other straight ticket shafts $31^y$ and $32^y$ for different parties, and differently spaced around the column of indicator-registers.

5 denotes a lever indicator adapted by means of its loose connection with a post 12 to move a part or door $6^x$ connected to said post and normally closing an opening 7 in the face of the plate through which an irregular ballot or ballot-holder, such as shown in Fig. 8 may be inserted.

8 indicates the side wall of a ballot receptacle to receive the ballot or ballot-holder, said walls being plates or partitions fixed to the casing overhead and terminating just above the plane of the shelf 9.

The lever has a fulcrum at 11 and is loosely connected with post 12 fixed to the slide $6^x$ carrying the floor 9 and back wall or stop 10 whereby these parts are moved through the medium of the lever. The ballot receiver, being closed to the incoming voter and as shown in Figs. 2 and 4, said lever is moved to the left with the effect to move the post 12 and the slide 6 with its floor 9, back 10, and door $6^x$ to the right. This movement places the floor or shelf 9 and the back wall 10 of the slide at the bottom and rear sides respectively of the space 6 between the plates 8 whereupon a ballot-holder can be inserted and supported on said floor or shelf 9, but one holder being supplied for a single vote. The outgoing voter by means of the handle or lever 29 and intermediate connections to be described, moves the face plate and all the parts supported thereon to the left with the effect to cause the deposited ballot to be pushed off floor 9 by the left hand wall 8, which is fixed to the casing above. The incoming voter by means of said handle 29 resets the indicator lever 5 and the slide and door by the movement of the face plate to the right.

$3^z$ denotes individual candidate indicators mounted on a shaft $3^x$ fixed to the face plate. Each indicator supports a register 14 comprising preferably units, tens and hundreds wheels, as usual, the unit wheel being provided with a register actuator or pawl $14^x$ which is movable with the indicator and register into coöperative relation with a stop 13 fixed on the wall of the casing. A movement of the face plate to the left after the stem or register actuator $14^x$ and the stop 13 have been put in alinement by shifting the register as indicated by broken lines in Fig. 2, actuates the register and counts one. The register counts before the face plate reaches its limit of movement to the left and after such counting movement to the left continues just sufficiently to carry pins 20 against bar 26 to reset the interlocking wedges and the indicators. The register carriers are in effect enlargements of the indicators 3 and are supported to reciprocate on axes fixed in any suitable way to the face plate.

15 denotes one of a series of straps each connecting a reciprocatory or rotary indicator with a corresponding reciprocatory or rotary interlocking wedge or block 16 of a series rotatably mounted on a shaft 17 supported by posts $17^x$ fixed to the face plate. Arrangement may be made in usual manner for operating two or more indicators in which case the unoperated indicators are locked. The straps 15 are pivotally connected to the indicators by pins 151, and to corresponding interlocking wedges by pins 150, alternately on opposite sides, to obviate their being moved by friction. A predetermined number of the indicators 3 are freely movable into and out of voted position without actuating the registers.

20 indicates removable and adjustable lugs on the interlocking wedges or locks which each coöperate with a lockout lever 21 and attached bar 22 to prevent the operation of any desired indicator 3. The straight ticket indicator shaft $3^y$ is provided with lugs 24 which engage with lugs 25 on the indicators 3 of the party represented by said straight ticket shaft $3^y$ to put the unit register wheel in operative relation to the stop 13 whenever a straight ticket indicator is suitably moved to indicate a choice, this movement being indicated by full and broken lines in Fig. 2. The straight ticket shaft $31^y$ is likewise provided with pins or lugs 24, coöperating with lugs 25 on indicators $3^z$ which belong to the party represented by shaft $31^y$, and the same arrangement is provided for shaft $32^y$ of the third party. Hence when a handle 4, 4', or 4'' is turned indicators of one party only will be actuated.

As represented the operative movement of the individual indicator is to the right, and that of the straight ticket indicator is to the left.

26 denotes a bar or post fixed to the casing in any suitable manner. The interlocking wedges, one or more, that have been turned by an indicator or indicators to effect an interlock, are reset by contact with post 20 when the face plate is moved to its limit at the left by the outgoing voter. This movement of the face plate actuates the registers by contact of parts $14^x$ and 13 before the resetting of the actuated wedges, which resetting is effected by the closing part of the face plate movement. It also resets the indicators.

In Fig. 2, 20' denotes the position of pin 20 when its wedge 16 has simply been turned on its axis by an indicator and by rod 15. 20'' denotes the position of the same pin at the moment when movement of the face plate has caused the voted registers to count; in this situation pin 20 is just against or close to the bar 26. Hence as the face plate continues to move to the left, the pin 20 being unable to move farther in the same direction on account of the obstruction offered by bar 26, is turned back to vertical position.

27 denotes a fixed stop against which the lever 5 is pressed when it and its fulcrum is carried to the left by the resetting action of the face plate returned by the incoming voter through the medium of pulleys 37 and 39 and finger or fingers 41.

The curtain frame or turnstile comprises a shaft 30 provided with arms 33 which move on and are partly supported by an annular track 34. 36 denotes the curtain rod fixed to and moving with said arms 33, one of which has a handle 29, to cause the curtain to cover the face of the machine and inclose the voter when he suitably moves the rod or support by means of said handle as he approaches the front of the machine to vote.

The shaft $32^x$ has fixed thereon a pulley 37 connected by a sprocket chain or other flexible connection 38 to drive a pulley 39 fixed on a shaft 40. This shaft has a short arm or arms 41 engaged with notches or depressions in the face plate whereby said plate is moved to the left to actuate the registers, and whereby it is returned by the outgoing voter with the effect to reset the indicators including any of the individual, regular ticket, and irregular indicators that have been left in voted position. It also resets the wedges as above described. This is effected when the voter leaves the face of the machine and (in the instance represented) moves the curtain to the left.

In Figs. 5 and 6 are represented two indicators connected by a plate 46 to be operated by the same movement of a single handle 3.

In case each party nominates two candidates for the same office and cumulative voting is not permitted, then two of the indicators having handles 3 are connected by a plate 46 so that they act as one, and one of the straps 15 belonging to the two connected indicators 3 is disconnected from its corresponding wedge so that the two indicators $3^z$ when actuated by the handle 3 will move as one, said handle also moving one interlocking wedge 16. In Fig. 1 the two lower indicators are shown thus connected, and but one of these has an interlock bar 15.

In Fig. 9 is represented a modification whereby double curtains with suitable supports are provided. 30 denotes a shaft journaled in the regular-vote-casing, and 31 a gear thereon co-acting with a gear 32, the axis or shaft of each gear being provided with or fixed to arms 33ˣ of two curtain rods or supports 36. As shown in Fig. 3 the gear 32 is idle but is adapted to be combined with a curtain frame as indicated in Fig. 9. By means of a handle 29 the double curtains may be opened and closed the line of opening and closing being in front of the machine.

It may be noted that the movement of the face plate, effected by the outgoing voter opening the door, comprising the curtain, actuates every register whose indicator, whether individual, party, or irregular, has been put in operative relation thereto.

It should be understood from the foregoing that the resetting bar 26 is fixed to the case and that the interlocking wedge support 17 is fixed to posts 17ˣ attached to the face plate as indicated in Fig. 2. The shafts or rods 3ˣ and 23 carrying the individual and party indicators are fixed to the face plate in substantially the same manner.

The interlocking devices, indicators, and registers are supported and moved bodily by the face plate, and they also have movements independent of the face plate.

The registers are made to count by the outgoing voter after he has by the appropriate indicator moved one or more register-actuators or spring pawls 14ˣ into alinement each with a corresponding stop or part 13, and who thereupon, by means of the turnstile, moves the face plate to the left causing engagement of the pawl with said part 13, the spring being provided to return the pawl which it will do even if the pawl be forced beyond the particular register tooth engaged thereby. Simultaneously with this operation and by means of connecting straps 15 the corresponding wedges 16 which had been previously interlocked are reset by means of lugs 20 carried against a bar 26 fixed to the bottom and top of the casing. In practice the distance of the lug 20 of a wedge in its interlocking situation from the bar 26 will be a trifle larger than that of the pawl 14ˣ from the stop 13 so that the wedge will be reset after the actuation of the register. The regular vote indicators, registers, and interlock devices, are complete and operative without irregular voting means and may be so used when desired.

It is obvious that the parts called "irregular" may be used for a "Yes" and "No" or similar vote, each voter being limited as to the number of ballots to prevent duplication of votes.

What I claim is,—

1. In a voting machine, the combination of a machine casing, a support movable with respect to said casing, a series of registers, a series of ballot indicators, both series being mounted on said support, and each indicator freely movable to bring its corresponding register into and out of an operative situation, a register-actuator, interlocking devices for preventing the operation of more than the predetermined number of indicators, and means for causing by the movement of said support a simultaneous operation of all the registers whose indicators are in operative position.

2. In a voting machine, the combination of a machine casing, a support movable with respect to said casing, of a series of registers, a series of rotary ballot indicators, both series being mounted on said support, and each indicator freely movable to bring its corresponding register into and out of an operative situation, a register-actuator, the actuator being carried on the support with the register, interlocking devices for preventing the operation of more than a predetermined number of indicators, and means for causing by the movement of said support a simultaneous operation of all the registers whose indicators are in operative position.

3. In a voting machine, the combination of a machine casing, a support movable with respect to said casing, a series of registers, a series of ballot indicators, both series being mounted on said support, each register and its indicator freely movable into and out of an operative relation with respect to an actuator, said actuator, interlocking devices for preventing the operation of more than a predetermined number of indicators, and means causing by the movement of said support a simultaneous operation of all the registers whose indicators are in operative position, said means shifting the entire series of ballot indicators whether or not the indicators have been actuated.

4. In a voting machine, a series of registers, a series of register-actuators, and a series of indicators the several series being carried by a movable supporting plate, said plate, and means for moving said plate to cause the registers of selected indicators to be operated.

5. In a voting machine, a casing, a series of shiftable registers on a single movable support carrying independently adjustable indicators capable of shifting corresponding registers, said indicators, said support, register-actuators, and means for imparting motion to the actuators, said means comprising the movable support, whereby the registers of selected indicators are actuated.

6. The combination of a machine casing, a support movable with respect to said casing and constituting a face plate, regular individual candidate registers, corresponding indicators, and interlocking mechanism therefor, said registers, indicators and mechanism being supported on said face plate, and means for moving the plate.

7. In a voting machine, a machine casing, a support movable with respect to said casing, plural series of indicators and a corresponding plural series of registers carried on said support, means for moving selected indicators to simultaneously shift corresponding registers, devices to actuate the shifted registers, mechanism for preventing the operation of other registers, and mechanism for returning all the series of indicators to an initial position.

8. In a voting machine, a machine casing, a support consisting of a face plate movable with respect to the casing and carrying several series of registers, a corresponding plural series of indicators on said support, said registers shiftable from an inoperative to an operative situation by said indicators, the registers in several series being operable at the same time, mechanism for operatively actuating the registers, mechanism for returning the support to an initial position, and means constituting a fixed part of the structure to limit the path of said support.

9. In a voting machine, the combination of a casing having an opening, a movable support closing the opening and constituting the face plate, plural series of indicators and corresponding plural series of registers on the support, and means for moving the support, selected registers being actuated to count by movement of the support.

10. In a voting machine, the combination of a movable support constituting a face plate, indicators attached thereto and receiving simultaneous movement by movement of the supporting face plate, registers on said plate having the same relative positions with respect to one another as the indicators, register-actuators carried by the plate, mechanism for moving the plate to bring an actuated indicator with its corresponding register and register-actuator into contact with a fixed stop to cause the actuation, and said stop.

11. In a voting machine, the combination of a machine casing, a support movable with respect to said casing, and constituting a face plate bearing a series of names of candidates and carrying a series of individual candidate registers and indicators, said indicators and registers for separately registering the number of votes for each candidate, and straight ticket mechanism actuating more than one register at a time.

12. In a voting machine, the combination of a machine casing, a support movable with respect to said casing, and having on itself plural series of names of candidates and constituting a face plate, means for moving said support, mechanism for separately registering the number of votes for each candidate, more than one register being operable at one time, devices for moving the support to bring selected indicators with corresponding registers having actuators into operative relation with a stop to effect the actuation, and said stop.

13. In a voting machine, a plural series of indicators, a movable support for the indicators, a corresponding plural series of registers attached to the support, mechanism for moving the support, and mechanism for actuating selected registers, registers for more than one candidate in more than one party being operable at one time by means of the support.

14. In a voting machine, a machine casing, a support movable with respect to said casing and having thereon a series of indicators, a series of interlocking parts connected with the indicators all movable with the support, a series of registers on the same support, and a series of register-actuators, said indicators being each movable to indicate a vote without counting on the corresponding register.

15. In a voting machine, the combination of a casing, an indicator and register support movable with respect to said casing, registers, indicators adapted to be independently operated by a voter into and out of operative position in relation to the actuating of the registers, each indicator having a separate register, and means controlling the support to cause the relative movement of the registers and the casing to operate the registers one number and return the parts to original position during a complete cycle of operation of the machine.

16. In a voting machine, the combination of a machine casing, a support movable with respect to said casing, registers, interlocking mechanism and vote indicators, one for each register and all attached to the movable support, and devices connecting the interlocking mechanism and register to prevent actuation of a register until the interlocking mechanism has been moved.

17. In a voting machine, the combination of a casing, regular-ticket vote indicators, registers for votes for indicated candidates, and mechanism for interlocking the indicators to prevent the indication and registry by a voter of more than a predetermined number of votes, said devices being all attached to a movable support, and said support.

18. In a voting machine, the combination of a movable support, a plurality of registers secured to said support, a plurality of ballot indicators on said support one for each register and each freely movable into and out of position to cause the shifting of a register, interlocking devices between the indicators to prevent the movement of more than a predetermined number to coöperative position, register-actuators, and means for moving the support to cause the registers of the actuated indicators to be operated.

19. In a voting machine, the combination of a movable support, a plurality of registers secured to said support, a plurality of ballot indicators thereon one for each register, each indicator being freely movable to shift the register to and from operative position, interlocking devices between the indicators to prevent the movement of more than a predetermined number to operative position, means for moving the support to cause the actuators of the registers to be operated, and resetting devices for the indicators.

20. The combination with a movable support containing a ticket to be voted, and a plurality of separate ballot indicators corresponding to the regular ticket, interlocking devices for the regular indicators, a plurality of registers on said support, one for each indicator, an operating device for causing the movement of any of the registers, and connections between the support and a registering device whereby the indicated ballots will be registered, and the resetting means for voted indicators returning them to normal position in a single cycle of operation.

21. The combination in a voting machine, of a machine casing, a support movable with respect to said casing, regular-ticket vote indicators mounted on said support, registers attached to the indicator support, there being an indicator for each register, and locking mechanism for regular indicators operated by any of said indicators, the indicators being capable of being actuated and withdrawn without actuating the registers to enable a voter to change his selected vote, said withdrawal operating to restore the locking mechanism to its normal position.

In testimony whereof, I have signed this specification in the presence of two subscribing witnesses.

CHARLES H. OCUMPAUGH.

Witnesses:
E. C. HEMPEL,
A. M. ZIMMER.

Copies of this patent may be obtained for five cents each, by addressing the "Commissioner of Patents, Washington, D. C."